US008904991B2

(12) United States Patent
Al-Hawaj

(10) Patent No.: US 8,904,991 B2
(45) Date of Patent: Dec. 9, 2014

(54) ROTARY MECHANISM WITH ARTICULATING ROTOR

(71) Applicant: Kuwait University, Safat (KW)

(72) Inventor: Osamah M. Al-Hawaj, Mubark Al-Kabeer (KW)

(73) Assignee: Kuwait University, Safat (KW)

( * ) Notice: Subject to any disclaimer, the term of this patent is extended or adjusted under 35 U.S.C. 154(b) by 13 days.

(21) Appl. No.: 13/681,297

(22) Filed: Nov. 19, 2012

(65) Prior Publication Data

US 2014/0140879 A1    May 22, 2014

(51) Int. Cl.
| F02B 53/00 | (2006.01) |
| F01C 1/44  | (2006.01) |
| F02B 55/14 | (2006.01) |
| F04C 2/44  | (2006.01) |

(52) U.S. Cl.
CPC . *F01C 1/44* (2013.01); *F02B 55/14* (2013.01); *F04C 2/44* (2013.01); *Y02T 10/17* (2013.01)
USPC ............................. 123/200; 123/241; 123/243

(58) Field of Classification Search
CPC .............. F01C 1/40; F01C 1/44; F01C 1/084; F01C 1/067; F01C 1/07; F02B 53/02; F02B 53/005; F02B 55/02
USPC ......... 418/108, 109, 112, 253, 257, 270, 254; 123/43 A, 45 R, 200, 218, 18 R, 241, 123/243
See application file for complete search history.

(56) References Cited

U.S. PATENT DOCUMENTS

| 716,970    | A  | * | 12/1902 | Werner ........................... 418/112 |
| 3,196,854  | A  | * | 7/1965  | Novak ............................ 418/270 |
| 3,226,013  | A  | * | 12/1965 | Sakakibara et al. .......... 418/61.1 |
| 3,295,505  | A  |   | 1/1967  | Jordan |
| 3,369,529  | A  | * | 2/1968  | Jordan ........................... 418/117 |
| 3,387,596  | A  | * | 6/1968  | Niemand ....................... 418/104 |
| 3,614,277  | A  | * | 10/1971 | Kobayashi .................... 418/253 |
| 3,918,415  | A  | * | 11/1975 | Ishida ............................ 418/253 |
| 3,990,817  | A  |   | 11/1976 | Ruf et al. |
| 4,021,159  | A  | * | 5/1977  | Huf ................................ 418/61.3 |
| 4,181,481  | A  | * | 1/1980  | Jordan ........................... 418/253 |
| 4,334,841  | A  | * | 6/1982  | Barlow ........................... 418/38 |
| 5,707,217  | A  |   | 1/1998  | Loeffler |
| 6,164,263  | A  | * | 12/2000 | Saint-Hilaire et al. ........ 123/241 |
| 6,718,938  | B2 | * | 4/2004  | Szorenyi ....................... 123/241 |

(Continued)

FOREIGN PATENT DOCUMENTS

FR    2493397    5/1982

*Primary Examiner* — Kenneth Bomberg
*Assistant Examiner* — Jason T Newton
(74) *Attorney, Agent, or Firm* — Richard C Litman

(57) ABSTRACT

The rotary mechanism with articulating rotor may be adapted as a pump or compressor when external power is applied to its shaft, as a motor when differential pressure is applied to its inlet and outlet ports, or as an internal combustion engine when provided with fuel, air, and ignition source. The mechanism includes an internal chamber having major and minor diameters. An articulating rotor having four linked segments rotates therein. The segments allow the rotor to articulate between square and rhomboid shapes as it rotates within the chamber, the rotor segments forming variable volume chamber portions as they rotate. The rotor segments are linked to the central shaft either by a transverse arm rotationally affixed to the central shaft and to diametrically opposed rotor segments, or by telescoping rods connecting the linked ends of the rotor segments to the central shaft.

7 Claims, 16 Drawing Sheets

(56) References Cited

U.S. PATENT DOCUMENTS

| | | | |
|---|---|---|---|
| 6,722,321 B2 | 4/2004 | Kim | |
| 6,899,075 B2 | 5/2005 | Saint-Hilaire et al. | |
| 7,178,502 B2 | 2/2007 | Okulov | |
| 2002/0189578 A1* | 12/2002 | Szorenyi | 123/241 |
| 2005/0000483 A1* | 1/2005 | Okulov | 123/241 |

* cited by examiner

ROTARY MECHANISM WITH ARTICULATING ROTOR

BACKGROUND OF THE INVENTION

1. Field of the Invention

The present invention relates generally to pumps, compressors, motors, and internal combustion engines, and particularly to a rotary mechanism having a multiple-segment articulating rotor for defining a plurality of internal chamber volume portions and for varying the volume portions during operation.

2. Description of the Related Art

Rotary mechanisms, i.e., pumps, motors, and internal combustion engines, have been known for a considerable period of time. Perhaps the most widely used application of such devices is in the field of hydraulic pumps and motors. The Wankel engine incorporating a two-lobe, epitrochoidal chamber and a triangular rotor has also found some application as a powerplant in various automobiles and motorcycles.

One characteristic of this configuration, particularly in internal combustion engines, is that the rotary speed must be relatively high in order to produce power. The single rotor Wankel engine produces only one power pulse per revolution of the output shaft due to the multiplication of output shaft speed relative to the rotor. Appropriate external gear reduction is easily incorporated to reduce the RPM to the desired rotational speed at the driveshaft and wheels of a motor vehicle, but it still proves difficult to meet the desired fuel economy with such an engine that must operate at relatively high rotational speeds.

Thus, a rotary mechanism with articulating rotor solving the aforementioned problems is desired.

SUMMARY OF THE INVENTION

The rotary mechanism with articulating rotor essentially comprises a case having an internal chamber that has major and minor diameters. An internal articulating rotor having four linked segments rotates within the chamber. The four segments define four separate chamber portions. The linked ends of the rotor segments move radially inward and outward as the rotor rotates within the non-circular case. The rotor alternates between square and rhomboid shapes as it rotates. The rotor segments are rotationally fixed to a central shaft and rotate the shaft in unison with the rotor. The linked ends of the rotor segments include seals that bear against the inner periphery of the chamber. A mechanism is provided to align the seals radially from the center of the chamber at all times, preventing the seals from tilting or cocking to the side due to friction and differential pressures between adjacent chamber portions as the seals bear against the chamber wall.

Several different embodiments are provided. Two different embodiments are determined according to the torque transfer between the rotor segments and the central shaft. One embodiment uses an arm rotationally fixed to the shaft and connected to two diametrically opposed rotors at its distal ends. Another embodiment connects the rotor ends to the central shaft using telescoping rods. Other embodiments are defined according to the aspect ratio, i.e., major and minor diameters, of the chamber of the case or housing.

The rotary mechanism is adaptable to many different applications. When differential pneumatic or hydraulic pressure is applied to its inlet and outlet ports, it functions as a pneumatic or hydraulic motor, the central shaft functioning as an output shaft. An ignition source may be provided, and a fuel-air mixture (or air and fuel injection) may be provided to the mechanism at the appropriate point for use as an internal combustion engine. Conversely, power may be applied to its rotary shaft to enable the device to function as a compressor or pump, the central shaft functioning as an input shaft.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The rotary mechanism with articulating rotor comprises a stationary case or housing having a non-circular chamber, and an internal rotor comprising four segments pivotally attached to one another at their ends. The articulating rotor segments define varying volumes in portions of the non-circular chamber as the rotor revolves within the chamber. The mechanism may be configured as a power output device (e.g., internal combustion engine, or hydraulically or pneumatically powered motor or compressor), or to receive power from an external source to serve as a hydraulic or pneumatic pump or compressor.

Figure 1:
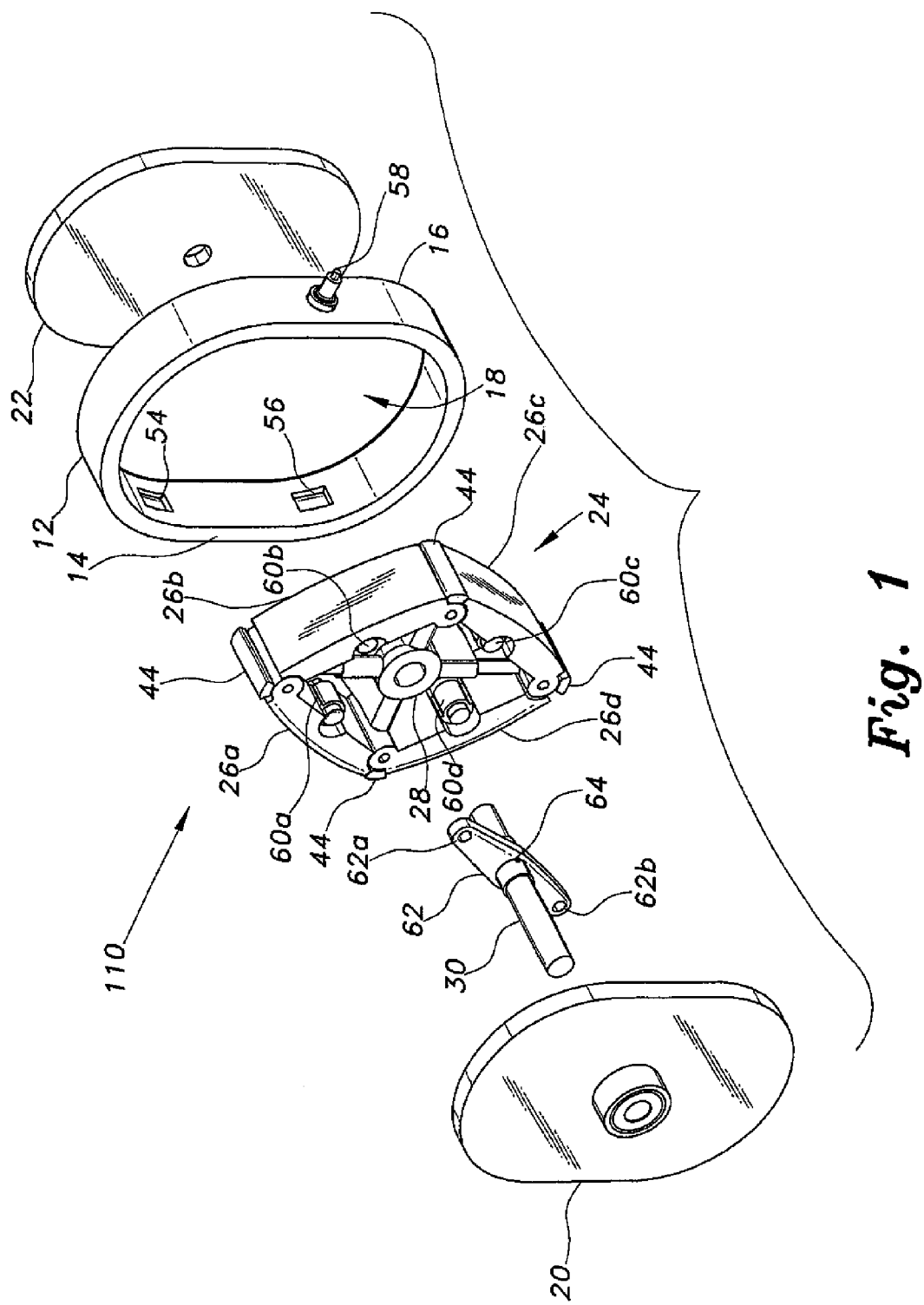
FIG. 1 is an exploded perspective view of a rotary mechanism with articulating rotor according to the present invention, illustrating its basic components and their relationship to one another.
Figure 2:
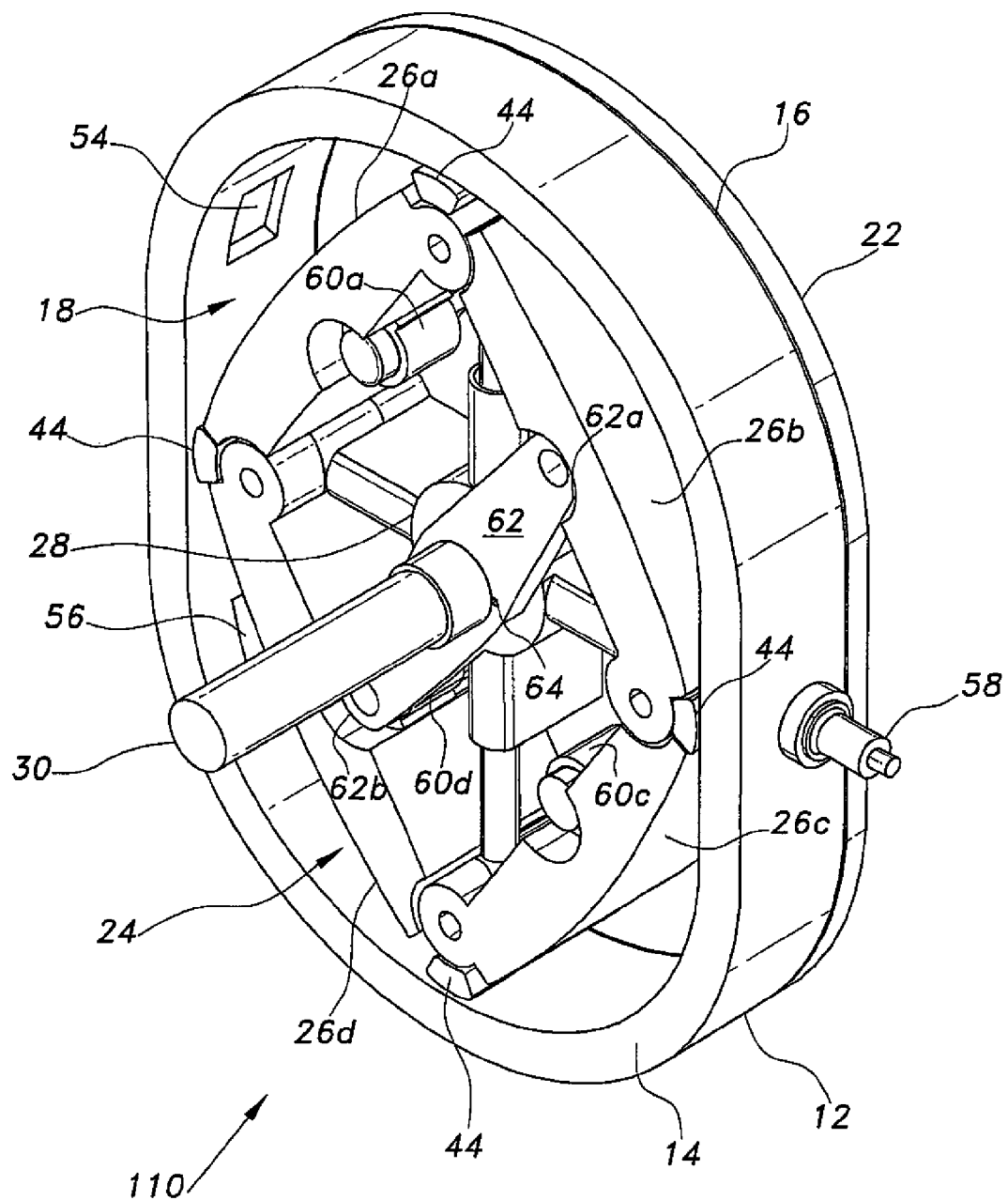
FIG. 2 is a perspective view of the assembled rotary mechanism with articulating rotor of FIG. 1, the front cover being removed to show the internal assembly.

FIG. 1 of the drawings provides an exploded perspective view of a first embodiment 110 of the rotary mechanism. FIG. 2 illustrates the assembled mechanism 110 with its forward or first end plate removed to show the rotor installed therein. The rotary mechanism 110 includes a case or housing 12 having a first end 14, an opposite second end 16, and an epitrochoidal chamber 18 therein. First and second end plates, respectively 20 and 22, attach and seal conventionally to their respective ends of the case 12; the conventional bolts, gaskets, etc., are not illustrated in FIGS. 1 and 2 for clarity in the drawings.

An articulating rotor 24 is disposed within the chamber 18 of the case 12. The rotor 24 is constructed of four mutually linked segments 26a through 26d. A central hub 28 is installed within the rotor 24, the rotor segments 26a through 26d being connected mechanically to the hub 28. A central shaft 30 is installed through the center of the hub 28, and extends through at least one of the two end plates 20 and/or 22 to serve as a power output shaft (in the case of a motor or engine) or power input shaft (in the case of a pump or compressor).

Figure 3A:
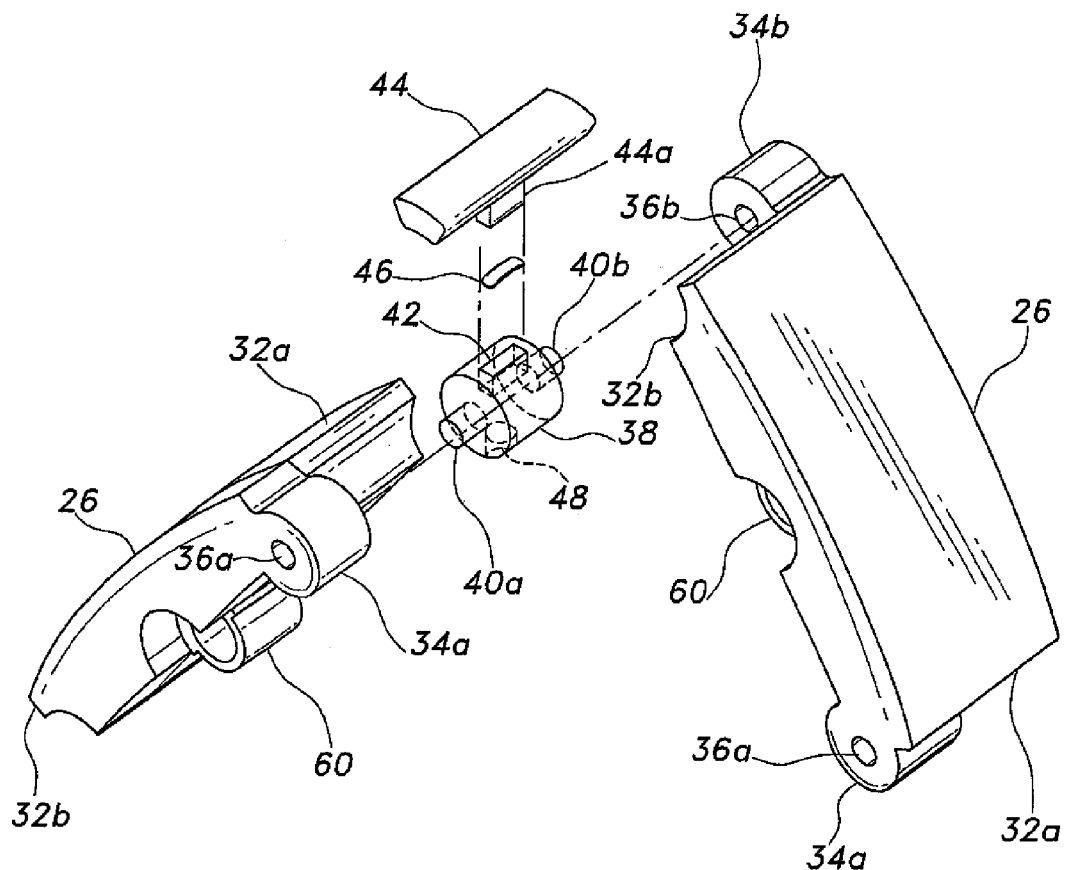
FIG. 3A is an exploded perspective view of two of the rotor segments of the rotary mechanism with articulating rotor according to the present invention, showing a first embodiment of a connector link for the rotor segments and of a peripheral seal.
Figure 3B:
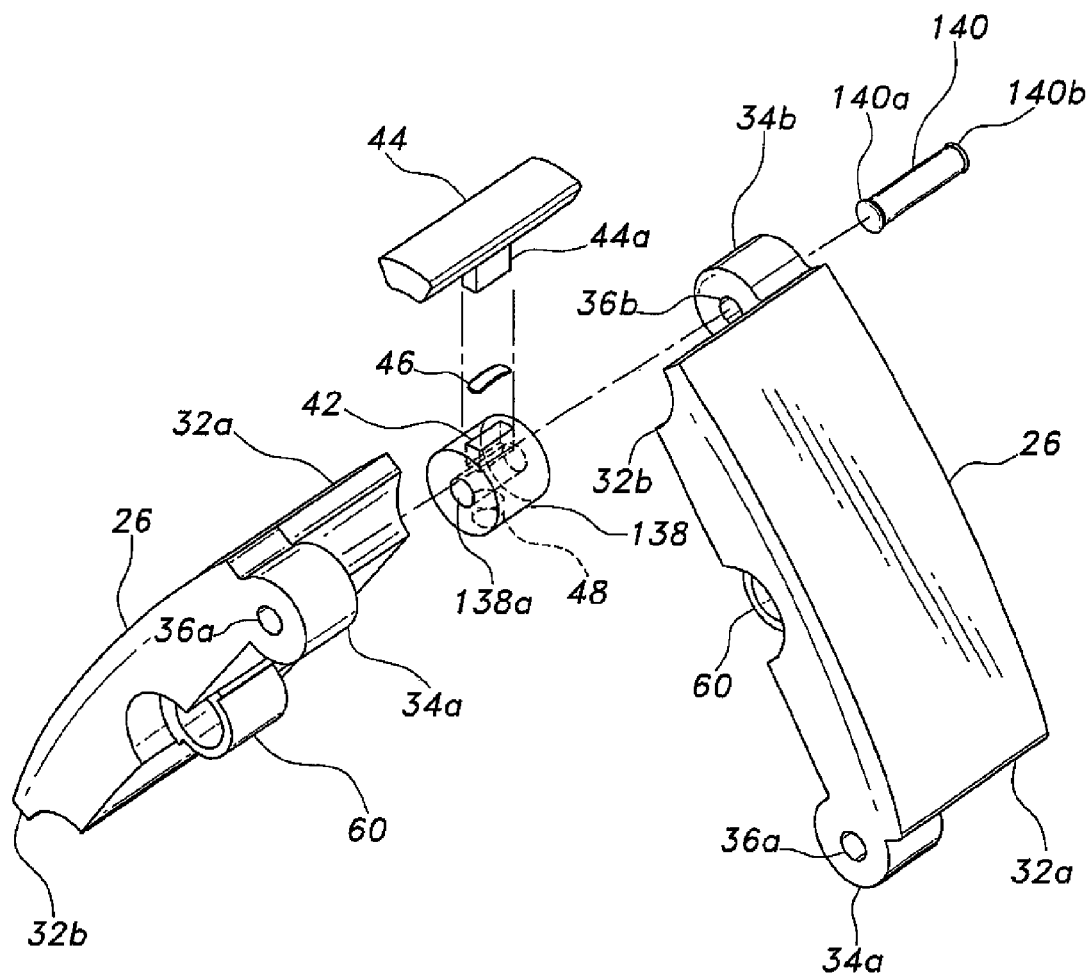
FIG. 3B is an exploded perspective view of two of the rotor segments of the rotary mechanism with articulating rotor according to the present invention, showing a second embodiment of a connector link for the rotor segments and of a peripheral seal.

FIGS. 3A and 3B provide exploded perspective views of two different means of linking the various rotor segments to one another. The rotor segments illustrated in FIGS. 2 and 3 are identical to one another, and to the rotor segments 26a through 26d of FIGS. 1 and 2, with the segments of FIGS. 3A and 3B being indicated generally by the reference numeral 26. Each of the rotor segments 26 includes a first end 32a and opposite second end 32b. Each end has a connecting lug or boss 34a, 34b, extending therefrom. The two connecting lugs or bosses 34a, 34b of each rotor segment 26 are laterally offset from one another, allowing the rotor segment 26 to be turned end-to-end without affecting the assembly.

Each of the lugs or bosses 34a, 34b has a knuckle pin passage 36a, 36b therethrough. In the embodiment of FIG. 3A, a connecting knuckle 38 has axially opposed first and second pins 40a and 40b formed integrally therewith. The first pin 40a of the connecting knuckle 38 is installed in the knuckle pin passage 36a of the connecting lug or boss 34a of the first end 32a of one of the rotor segments, and the second pin 40b of the knuckle 38 is installed in the knuckle pin passage 36b of the connecting lug or boss 34b of the second end 32b of the adjacent rotor segment. Thus, a total of four of the connecting knuckles 38 are assembled between the four rotor segments 26a through 26d to form the articulating rotor assembly 24 as shown in FIGS. 1 and 2.

FIG. 3B illustrates a somewhat different connecting knuckle configuration. In FIG. 3B, the connecting knuckle 138 comprises a cylindrical barrel having a pin passage 138a formed axially therethrough. A pin 140 having opposite ends 140a and 140b is installed in the pin passage 138a of the knuckle 138. The pin end 140a is inserted into the pin passage 36a of the connecting lug or boss 34a of the first end 32a of one of the rotor segments, and the opposite pin end 140b is inserted into the pin passage 36b of the connecting lug or boss 34b of the second end 32b of the adjacent rotor segment. The assembly is functionally equivalent to the assembly formed of the components illustrated in FIG. 3A and described further above.

Each of the connecting knuckles 38 and 138 is provided with an apex seal receptacle 42 therein. An apex seal 44 is connected to each of the connecting knuckles 38 and 138 by a seal stem 44a that is inserted into the seal receptacle 42 of the corresponding connecting knuckle 38 or 138. A seal spring 46 (a leaf spring) is placed in the bottom of each seal receptacle 42 to bear against the bottom of the seal stem 44a and urge the seal 44 outward to make sliding contact with the inner surface of the chamber 18 of the case 12.

Each of the connecting knuckles 38 and 138 also has an alignment rod socket 48 formed therein diametrically opposite the apex seal receptacle 42. FIGS. 4A through 4D illustrate a second embodiment 210 of the rotary mechanism with articulating rotor and the purpose of the alignment rod sockets 48 and the structure associated therewith in the rotary mechanism 210. In FIGS. 4A through 4D, it will be noted that the central hub 28 includes four radially disposed, mutually orthogonal alignment rod receptacles 50a through 50d therein. Each of the receptacles 50a through 50d includes a seal alignment rod 52a through 52d disposed telescopically therein. The distal ends of the rods 52a through 52d are locked or secured in their respective alignment rod sockets 48, and telescope in their respective receptacles 50a through 50d in the hub 28. In this manner, each of the knuckles is prevented from oscillating in the plane of the rotor 24 as it revolves within the case 12, thus holding the apex seals 44 in axial alignment with their respective seal alignment rods 52a through 52d and preventing oscillation due to frictional drag on the chamber wall and/or differential pressures between the chamber portions defined by the rotor segments as they rotate within the chamber.

The above-described mechanism between the hub 28 and the knuckles 38 or 138 may also serve to transfer torque from the rotor 24 to the central shaft 30, or from the shaft 30 to the rotor 24. The hub 28 may be rotationally locked to the shaft 30 by any of a number of conventional means, e.g., keyway and key, splines, etc. As the rotor 24 rotates within the chamber 18, the knuckles 38 or 138 linking the rotor segments 26a through 26d rotate therewith. Since the knuckles 38 or 138 are rotationally affixed to the seal alignment rods 52a through 52d, and the rods are rotationally affixed to the hub 28 by means of their telescoping in and out of their receptacles 50a through 50d, the hub 28 is constrained to rotate with the rotor 24. If the hub 28 is rotationally affixed to the central shaft 30, the shaft 30 rotates in unison with the rotor 24.

FIGS. 4A through 4D also illustrate the operation of the rotary mechanism 210, it being understood that the rotation of the rotor 24 and variation in the portions of the chamber volume defined by the rotor segments 26a through 26d is the same for the embodiment 110 of FIGS. 1 and 2. The operation described below for FIGS. 4A through 4D is descriptive of an internal combustion engine, rotation being in a clockwise direction, as depicted in FIGS. 4A through 4D. The operational cycle of the rotary mechanism 110 or 210 comprises four separate cycles or phases, analogous to the four stroke Otto cycle of the conventional reciprocating internal combustion engine.

Figure 4A:
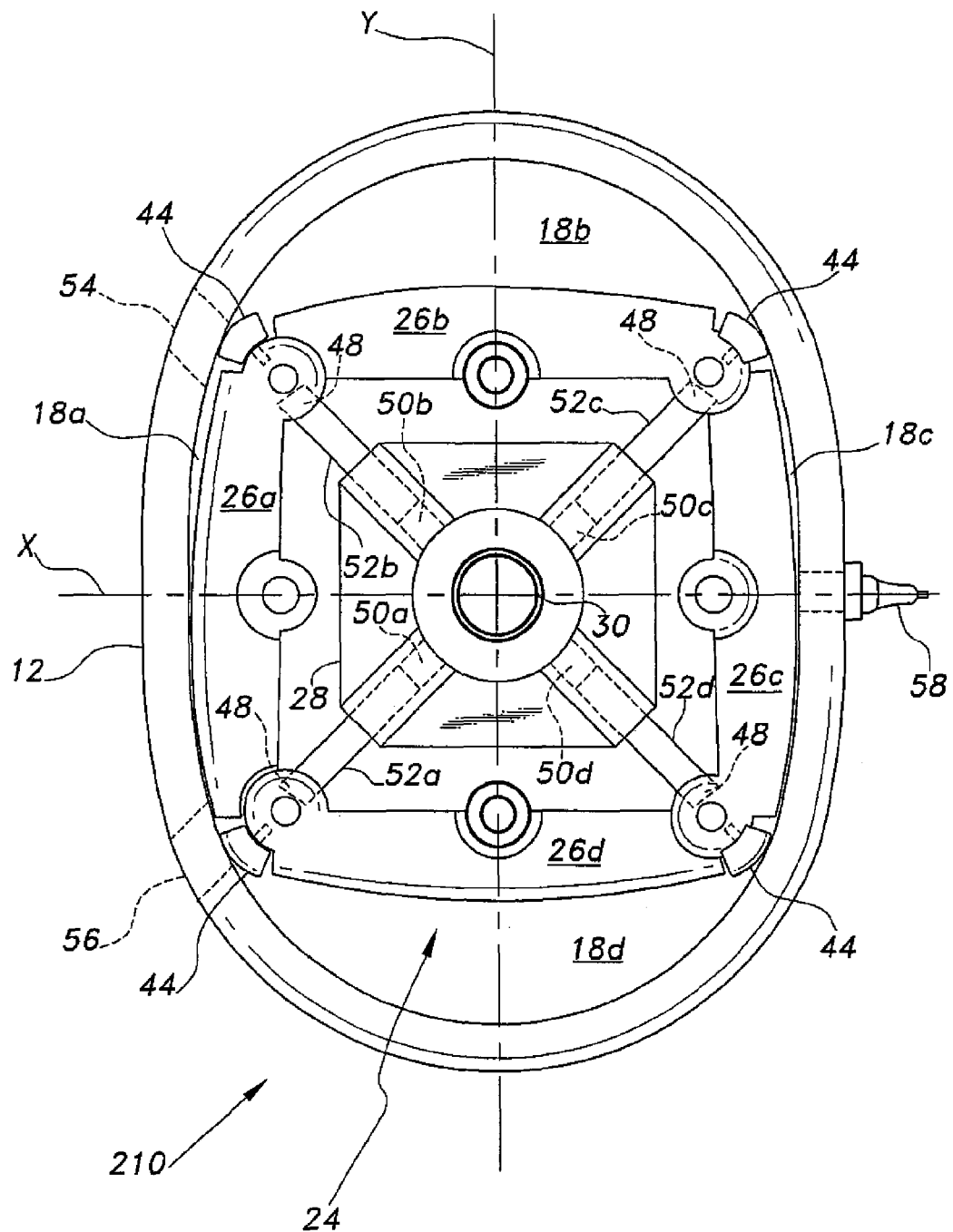
FIG. 4A is a front elevation view of the rotary mechanism with articulating rotor according to the present invention, the front cover being removed to illustrate a first position in the rotary cycle of the mechanism.

In FIG. 4A, the rotor 24 is oriented in the case 12 such that two of the rotor segments 26a and 26c define minimal chamber volume portions 18a and 18c between those segments and the chamber wall, while the other two rotor segments 26b and 26d define maximum chamber volume portions 18b and 18d. At this point, the seal 44 between rotor segments 26a and 26b is just passing the inlet port 54 and the chamber portion volume 18a will begin to expand as the rotor continues to rotate, thereby drawing air into the chamber portion volume 18a. Simultaneously, the clockwise rotation of the rotor 24 will result in the chamber portion volume 18b being compressed as the rotor segment 26b rotates. The chamber portion volume 18c on the opposite side of the case 12 from the inlet and exhaust ports 54 and 56 is compressed to minimum volume and maximum pressure in FIG. 4A, to provide optimum efficiency as the air and fuel mixture therein is ignited by the spark plug 58. Finally, the last chamber portion volume 18d has expanded to its maximum volume due to the heat expansion of the burned air and fuel mixture previously ignited by the spark plug 58, the apex seal 44 between the two rotor segments 26d and 26a just reaching the exhaust port 56 to expel the spent gases as the rotor segment 26d continues to rotate toward the position occupied by the segment 26a in FIG. 4A.

Figure 4B:
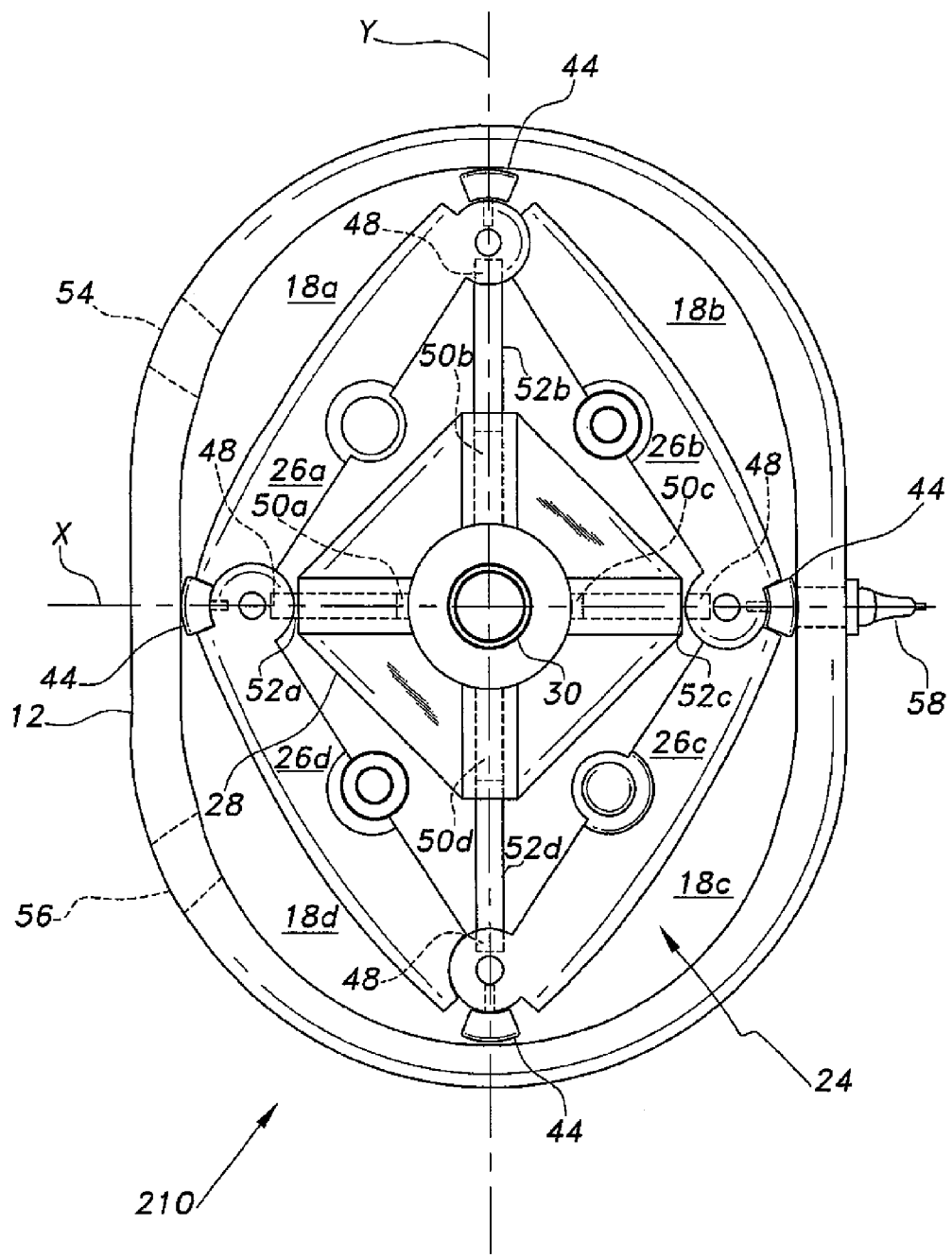
FIG. 4B is a front elevation view of the rotary mechanism with articulating rotor according to the present invention, the front cover being removed to illustrate a second position in the rotary cycle of the mechanism advanced 45° from the first position.
Figure 4C:
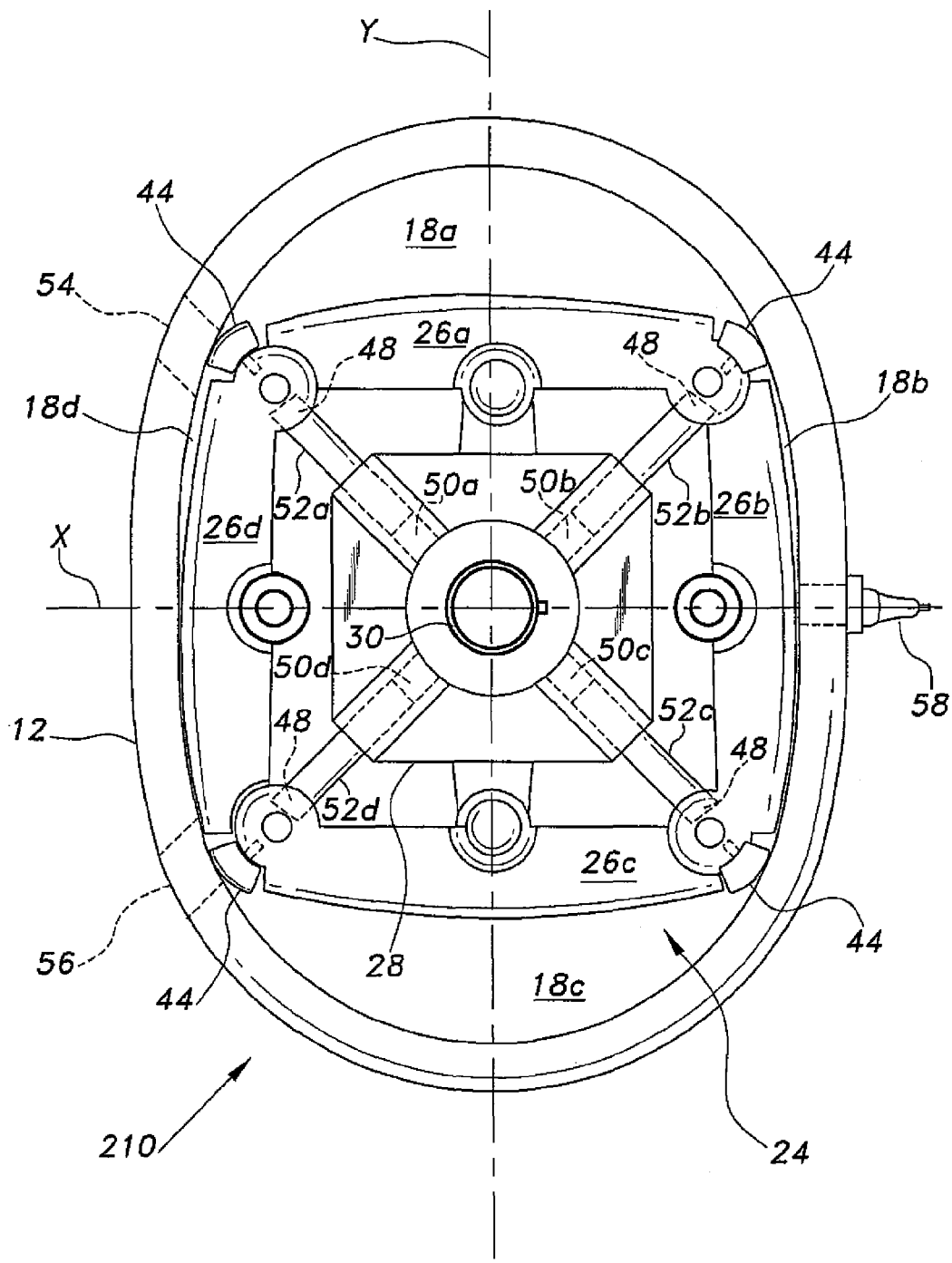
FIG. 4C is a front elevation view of the rotary mechanism with articulating rotor according to the present invention, the front cover being removed to illustrate a third position in the rotary cycle of the mechanism advanced 90° from the first position.

FIG. 4B illustrates the rotary mechanism 210 with the internal articulating rotor 24 rotated forty-five degrees clockwise from the position shown in FIG. 4A. This has resulted in two of the apex seals 44 being oriented along the minor axis X of the case 12, and the other two seals being oriented along the major axis Y. This orients all of the rotor segments 26a through 26d to extend between the minor and major axes X and Y, resulting in equal volumes for each chamber portion 18a through 18d at this point. As the rotor 24 continues to rotate, the chamber volume 18a will continue to increase from its minimum volume, as shown in FIG. 4A, to a maximum volume, as shown in FIG. 4C, drawing in a fresh charge of air (and fuel, if the fuel is mixed with the incoming air charge) through the intake port 54. Simultaneously with the above, the second chamber volume portion 18b is being swept around clockwise and is decreasing in volume to compress its charge. The third chamber portion volume 18c has passed the ignition source (e.g., spark plug 58), the burning fuel and air mixture expanding to drive the rotation of the rotor 24 as it forces the expansion of the third chamber portion volume 18c. The fourth chamber portion volume 18d is communicating with the exhaust port 56 at this point, to expel the burned fuel and air mixture from its chamber portion volume 18d.

In FIG. 4C, the first chamber portion volume 18a has rotated to a position that is laterally symmetrical across the major axis Y, resulting in the maximum volume for the chamber portion volume 18a. It will be seen that the trailing apex seal 44 between the rotor segments 26a and 26d is just passing the intake port 54 at this point, thereby sealing the first chamber volume portion 18a. The chamber portion volume leading the volume 18a, i.e., chamber volume portion 18b, has rotated to lie symmetrical across the minor axis X, thereby reducing to minimum volume and compressing the air and fuel charge therein to its maximum pressure before combustion. The ignition source 58 fires at or about this time (ignition may be timed to occur slightly ahead of maximum compression, as shown in FIG. 4C, for maximum efficiency) to ignite the mixture in the chamber volume portion 18b, causing it to expand to drive the rotor 24 about its rotation. The leading seal 44 of the rotor segment 26c defining the third chamber portion volume 18c is just reaching the exhaust port 56, and the chamber portion volume 18c simultaneously reaches its maximum volume. Further rotation results in the chamber volume portion 18c communicating with the exhaust port or outlet 56, and subsequent reduction in the volume within the chamber volume portion 18c causes the spent exhaust gases to be expelled through the exhaust port 56.

Figure 4D:
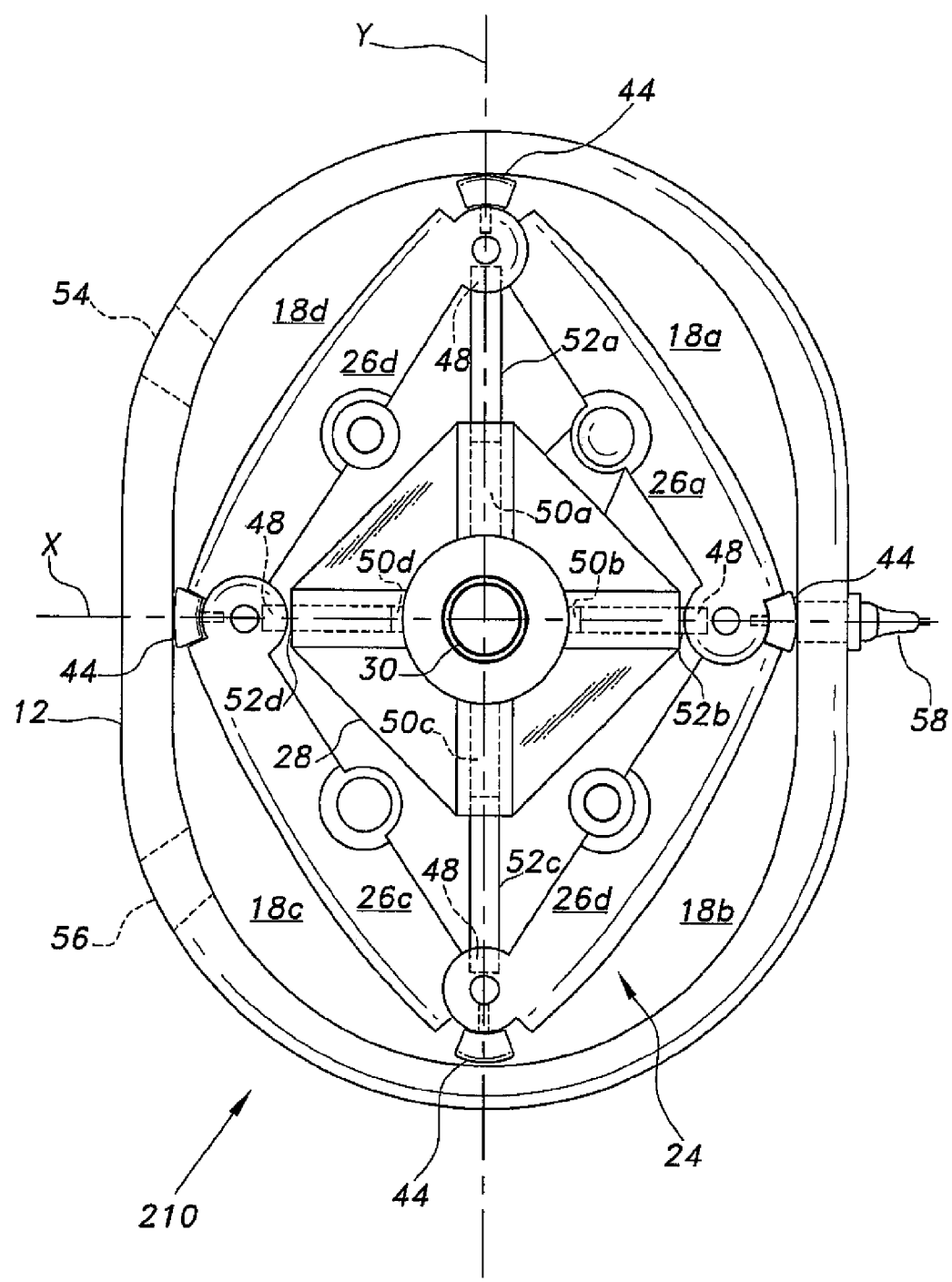
FIG. 4D is a front elevation view of the rotary mechanism with articulating rotor according to the present invention, the front cover being removed to illustrate a fourth position in the rotary cycle of the mechanism advanced 135° from the first position.

In FIG. 4D, the first rotor segment 26a is shown as having rotated about 135° clockwise from the initial position shown in FIG. 4A. The geometry of this position is identical to that shown in FIG. 4B, but with each of the rotor segments having advanced 90° clockwise from the positions shown in FIG. 4B. Thus, the first rotor segment 26a is compressing the air and fuel charge within the first chamber portion volume 18a, and the second chamber volume portion 18b contains a burning fuel and air mixture that is causing volume 18b to expand to push the rotor 24 about its clockwise rotation within the case 12. The third chamber volume 18c is approximately midway through its reduction in volume as it expels the burned combustion gases therefrom, and the fourth chamber volume 18d is at about its midpoint in its intake process. The procedure continues as described above, the result being four distinct power pulses per revolution of the rotor 24, or the equivalent of an eight-cylinder Otto cycle reciprocating internal combustion engine.

The rotary mechanism 210 of FIGS. 4A through 4D has been described as transmitting torque between the rotor 24 and the central shaft 30 by means of the seal alignment rods 52a through 52b and their rotation with the central hub 28, and the hub 28 being rotationally locked to the central shaft 30. However, other means may be provided for torque transmission between the rotor 24 and shaft 30. Returning to the rotary mechanism 110 of FIGS. 1 and 2, it will be noted that each of the rotor segments 26a through 26d includes a centrally disposed arm attachment lug, 60a through 60d. A transverse arm 62 is rotationally affixed to the central shaft 30, e.g., by means of a key and keyway 64 or other conventional means. The arm 62 has mutually opposed distal ends 62a and 62b that attach to corresponding arm attachment lugs, e.g., lugs 60b (shown in FIG. 1) and 60d. Each of the generic rotor segments 26 of FIGS. 3A and 3B is also shown with such a lug 60. As the arm 62 is thus rotationally affixed to the rotor 24 and to the central shaft 30, the central shaft 30 is constrained to rotate with the rotor 24.

It will be noted that due to the articulation of the rotor 24 as it rotates within the case 12, there will be a cyclic differential in rotation between the arm 62 and the central hub 28. Thus, either the transverse arm 62 or the central hub 28 may be rotationally affixed to the central shaft 30, but not both. The transverse arm 62 may be used to transmit torque between the central shaft 30 and the rotor 24 in configurations where the seal alignment rods 52a through 52d, and/or the central hub 28 have insufficient strength to transmit such torsional forces. While two such arms 62 may be installed in the rotary mechanism 110, it will be seen that the same cyclic differential in rotation will occur between the two arms if they are attached to different rotor segments, e.g., one arm being attached to rotor segments 26b and 26d and the other arm being attached to the opposite sides of rotor segments 26a and 26c. Thus, only one of the arms 62 will be rotationally affixed to the central shaft 30 to transmit torque therebetween.

Figure 5:
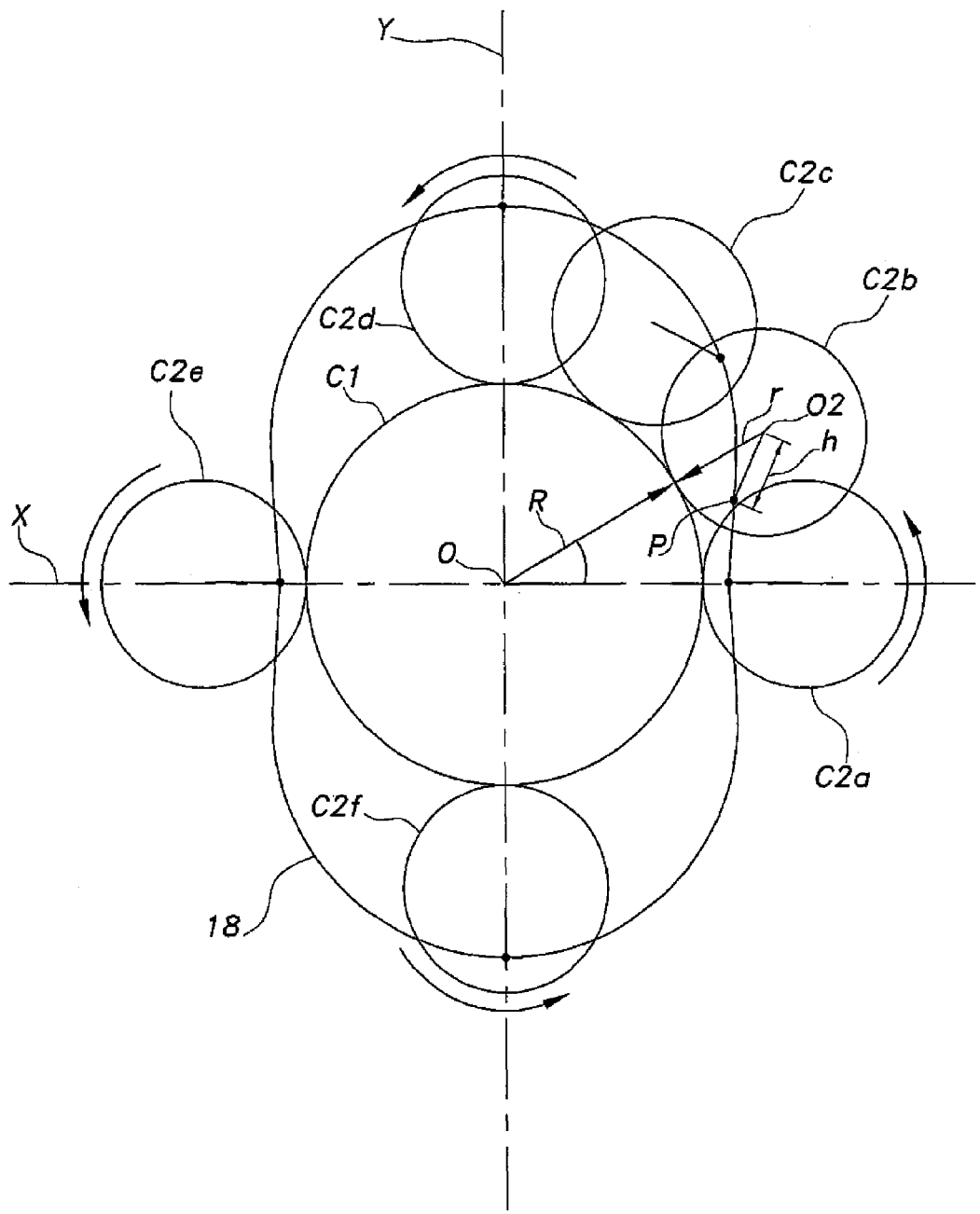
FIG. 5 is a diagram used in developing the shape of the internal wall of the case or housing of the rotary mechanism with articulating rotor according to the present invention.

FIG. 5 of the drawings is a graphical representation of the mathematics for developing the chamber wall of the case 12 of the rotary mechanism. Initially, a larger central circle C1 is developed about an origin or center O1, the circle C1 having a radius R. A series of smaller circles C2a through C2f are shown in FIG. 5 tangent to the larger circle C1. The smaller circles indicate the progressive path of a single such smaller circle as it rolls about the circumference of the larger circle C1. Each of the smaller circles C2a through C2f has a radius r equal to one-half the radius R of the larger circle C1, as shown in the second smaller circle C2b, in order to generate a two-lobed epitrochoidal chamber 18. It will be seen that as the radius r of the smaller circles C2b (and all other smaller circles as well) is one-half the radius R of the larger circle C1, the circumferences of the smaller circles C2a through C2f will be one-half the circumference of the larger circle C1. Thus, the smaller circle will make two revolutions as it makes one rolling transit about the larger circle C1, as indicated by the series of smaller circles C2a through C2f. This results in the chamber 18 having two lobes distributed along the major axis Y, and a narrower minor diameter distributed along the minor axis A2 normal to the major axis X.

A point P is defined at a distance h from the center O2 of the smaller circle, as shown in the second smaller circle C2b. As the smaller circle C2a, etc., rolls about the larger circle C1, the point P generates a two lobed epitrochoidal chamber shape 18, as shown in FIG. 5. The chamber periphery is defined by the equations $x(\theta)=3r\cos(\theta)-h\cos(3\theta)$ and $y(\theta)=3r\sin(\theta)-h\sin(3\theta)$, where x is the x-coordinate of the epitrochoidal curve aligned with the minor axis, y is the y-coordinate of the epitrochoidal curve aligned with the major axis, θ is the angle in degrees relative to the minor axis, r is equal to one-half of the radius R of the central circle and equal to the radius of the peripheral circle defining the epitrochoid, and h is a fraction between zero and one of the radius r of the peripheral circle.

The distance h is selected to be some fraction between 0 and 1 of the smaller circle radius r. It will be seen that if the distance h is zero, then the point P will be defined as the center of the smaller circle, thus resulting in the generation of a larger diameter circle having a radius equal to the radius R of the larger circle C1 added to the radius r of the smaller circle. In such a situation, there would be no articulation of the rotor within the case of the mechanism, and thus no changes in the chamber volume portions. The opposite extreme would result in a major axis (height of the chamber 18, as shown in FIG. 5) having a length twice that of the minor axis, as the point P would be one diameter of the smaller circle from the circumference of the larger circle at its greatest distance from the center of the larger circle O. The minor axis or width of the chamber 18 would be equal to the diameter of the larger circle C1.

Figure 6:
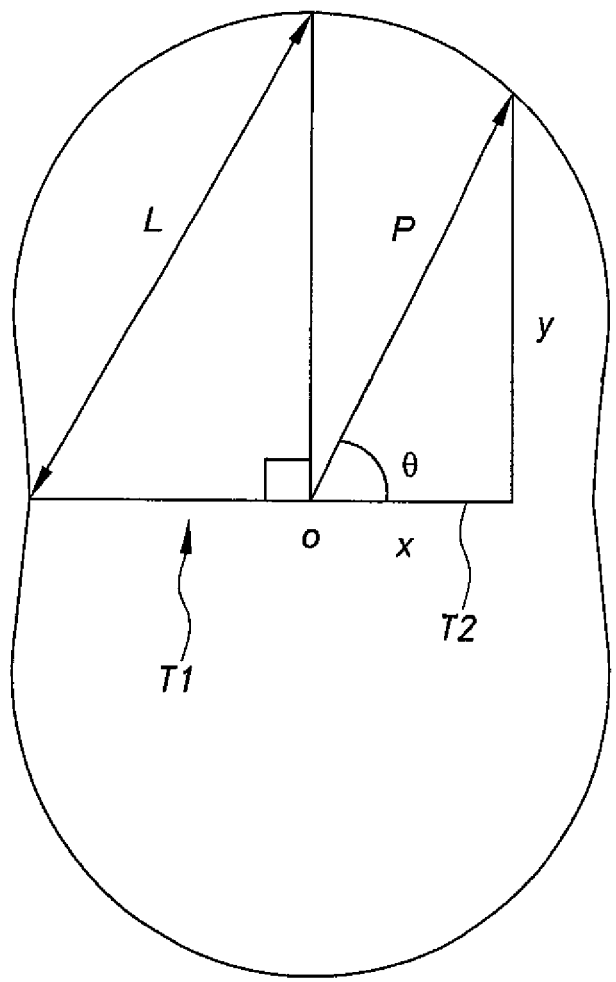
FIG. 6 is a diagram showing generation of the shape of the internal wall of the case or housing of the rotary mechanism with articulating rotor according to the present invention by rotating a right triangle having a fixed length hypotenuse, the hypotenuse length being determined according to the points and radii of the geometric figure of FIG. 5.

FIG. 6 of the drawings is a graphical representation of an alternative means of developing the epitrochoidal shape of the chamber of the rotary mechanism. It will be seen that the span L of each of the rotor segments between their apex seals is given by the equation $L=\sqrt{(R+r+h)^2+(R+r-h)^2}$, where R is the radius of the larger circle, r is the radius of the smaller circle rolling about the circumference of the larger circle as shown in FIG. 5, and h is the distance of a point along the smaller circle radius r between the center of the circle and the periphery of the circle. In FIG. 6, the epitrochoid shape of the chamber is generated by creating a right triangle T1 having a hypotenuse L having a length in accordance with the above equation. The right triangle T1 is free to rotate about its right angle vertex, and the two right legs of the triangle are free to vary in length, but the hypotenuse has a length fixed in accordance with the above equation. The result will be an epitrochoid shape as shown in FIG. 6 of the drawings. The second right triangle T2 represents the location of the point P used to generate the epitrochoid shape, where its acute angle θ is the angle between the horizontal or x-axis and the hypotenuse, $\theta=\arctan(y/x)$, and $P=\sqrt{x^2+y^2}$, where x is the horizontal axis and y is the vertical axis.

Figure 7A:
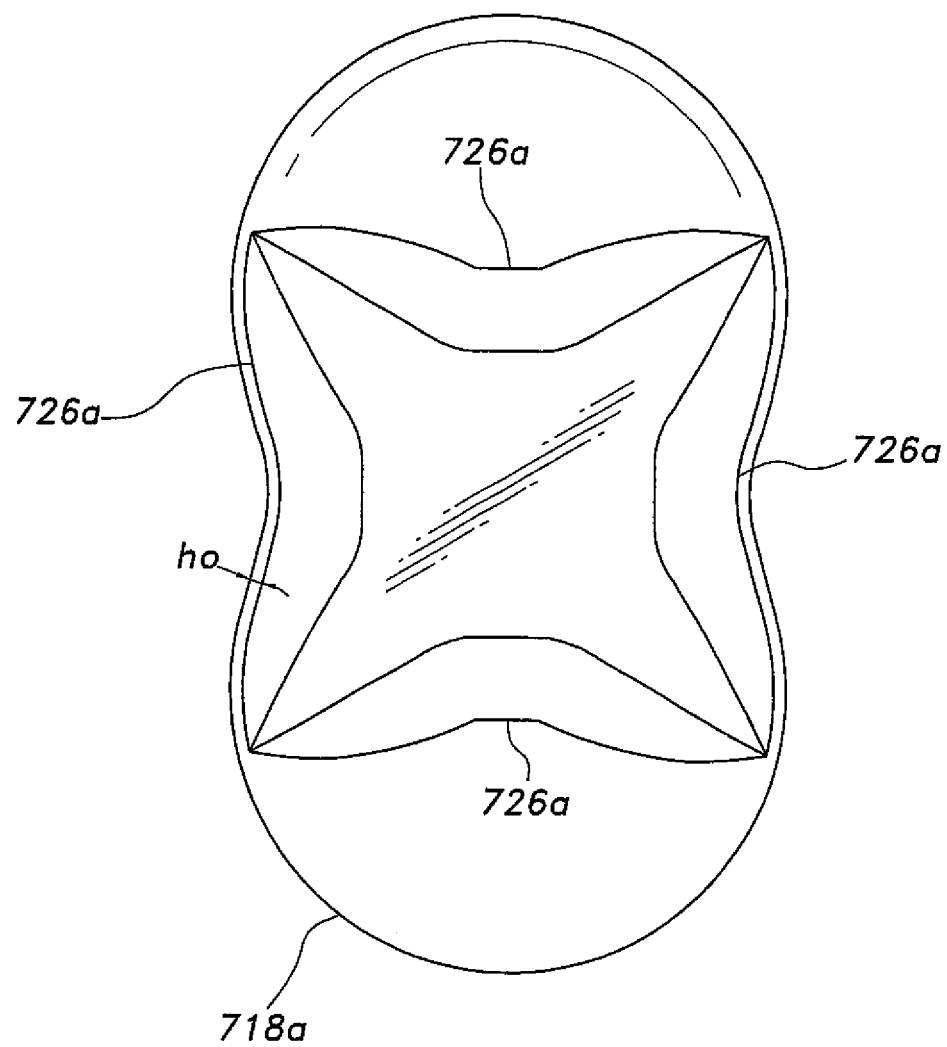
FIG. 7A is a diagram of the rotor and internal wall of the case or housing of the rotary mechanism with articulating rotor according to the present invention, which is generated by a point on the radius of a rolling circle, wherein the distance of the point from the center of the rolling circle and the radius of the rolling circle are equal.
Figure 7B:
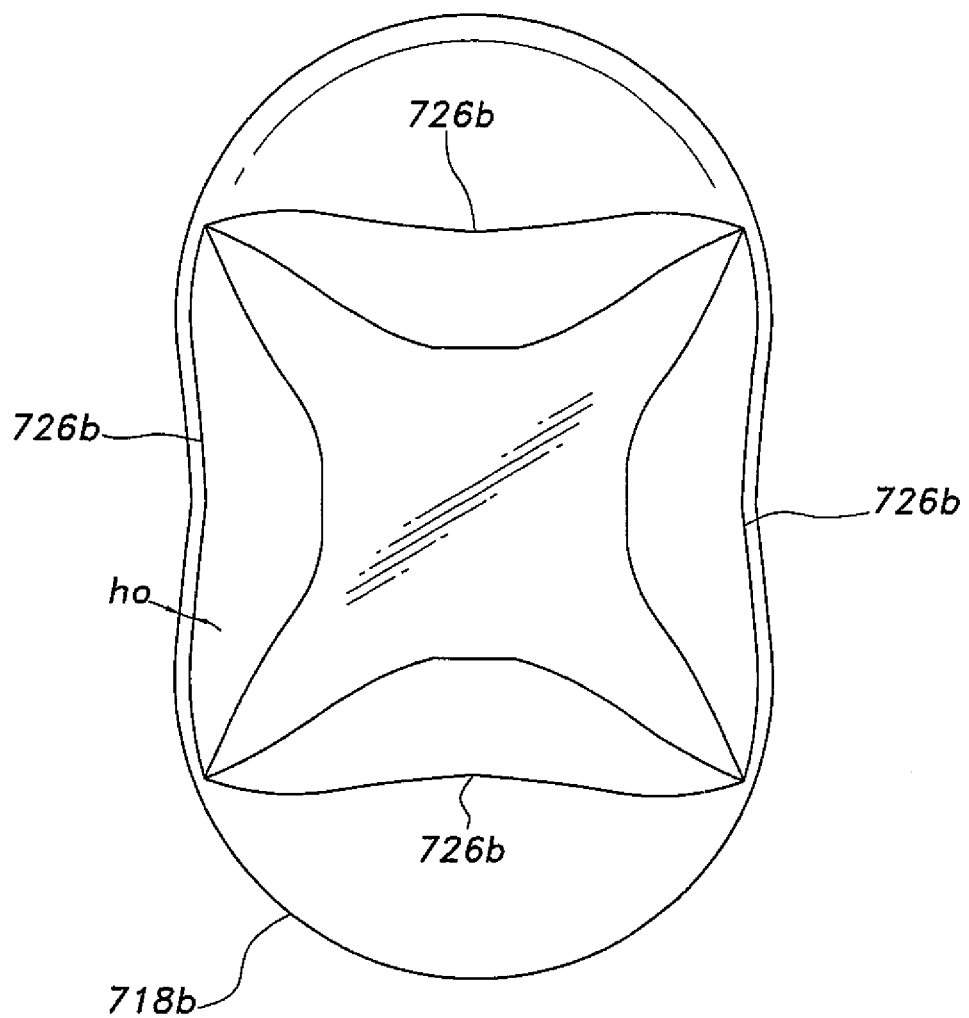
FIG. 7B is a diagram of the rotor and internal wall of the case or housing of the rotary mechanism with articulating rotor according to the present invention, which is generated by a point on the radius of a rolling circle, wherein the ratio of the distance of the point from the center of the rolling circle to the radius of the rolling circle is less than one.

FIGS. 7A through 7E illustrate five examples of different epitrochoidal shapes generated as described above, the difference in the shapes being due to different lengths or radial fractions for the distance or length h in each case. In FIG. 7A, h is set as 1, i.e., equal in length to the radius r of the smaller diameter rolling circle. This results in an epitrochoidal chamber shape 718a as described in the example above. In FIG. 7B, the epitrochoidal chamber shape 718b is not so extreme as the chamber shape 718a of FIG. 7A, i.e., the chamber shape 718b has a major axis length less than twice the minor axis length. The chamber shape 718b has been generated by placing the point P on the radius r of the rolling circle at a point twenty percent inboard along the radius r from the circumference. This results in a distance h of 0.8 of the smaller circle radius r.

Figure 7C:
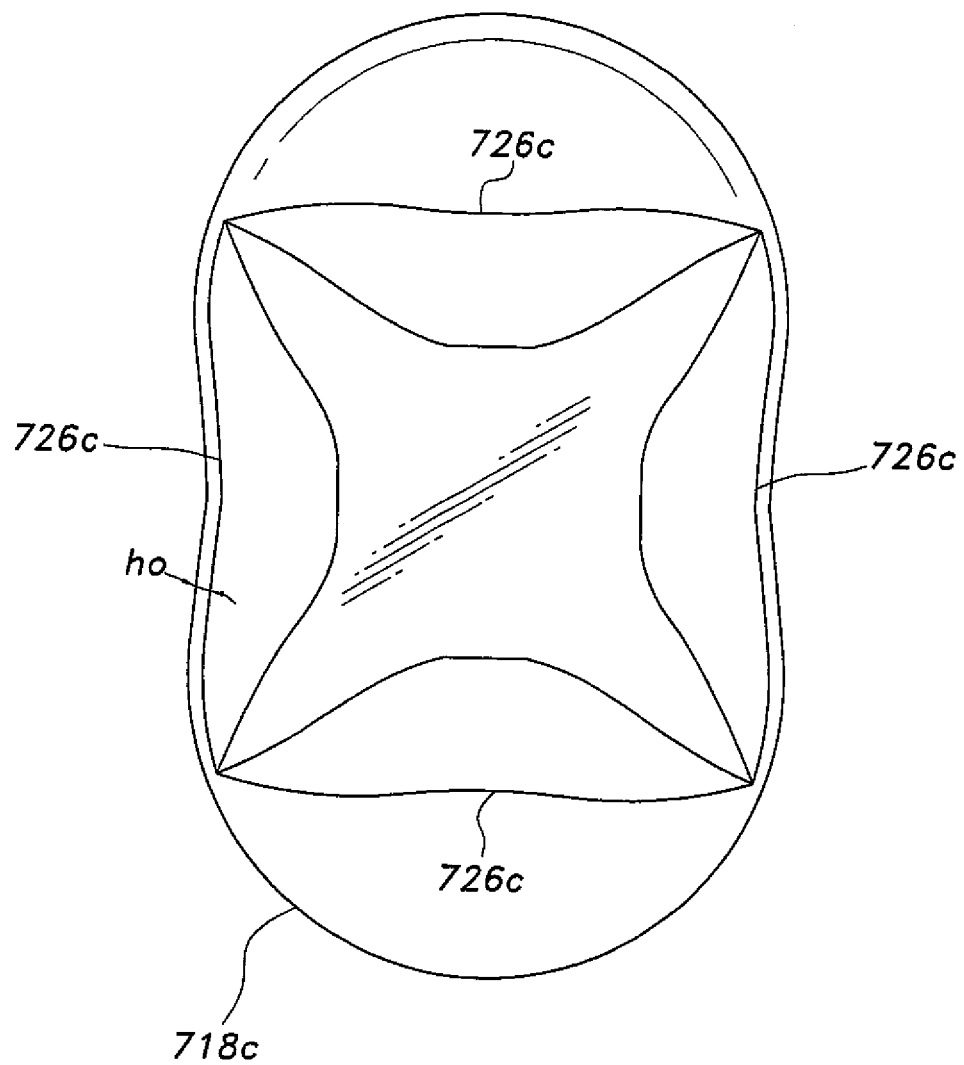
FIG. 7C is a diagram of the rotor and internal wall of the case or housing of the rotary mechanism with articulating rotor according to the present invention, which is generated by a point on the radius of a rolling circle, wherein the ratio of the distance of the point from the center of the rolling circle to the radius of the rolling circle is less than that of FIG. 7B.
Figure 7D:
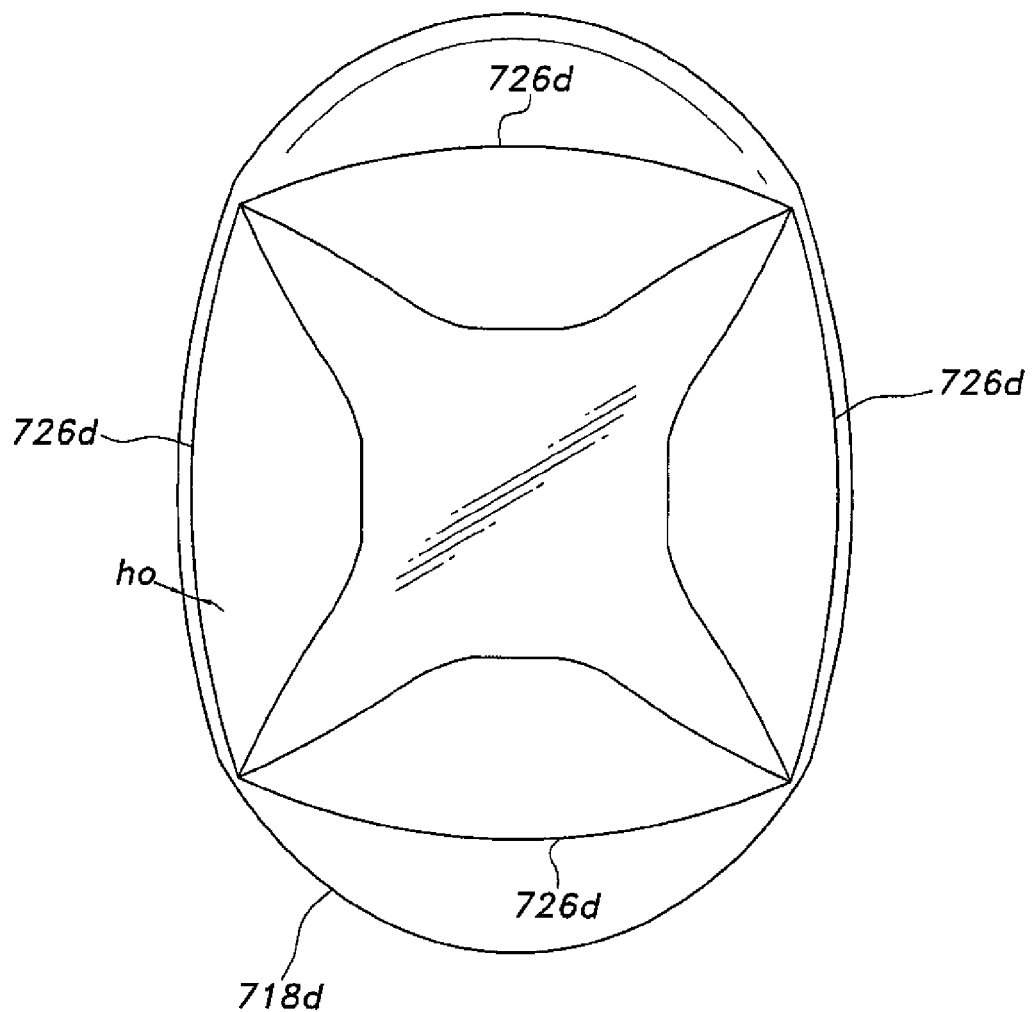
FIG. 7D is a diagram of the rotor and internal wall of the case or housing of the rotary mechanism with articulating rotor according to the present invention, which is generated by a point on the radius of a rolling circle, wherein the ratio of the distance of the point from the center of the rolling circle to the radius of the rolling circle is less than that of FIG. 7C.
Figure 7E:
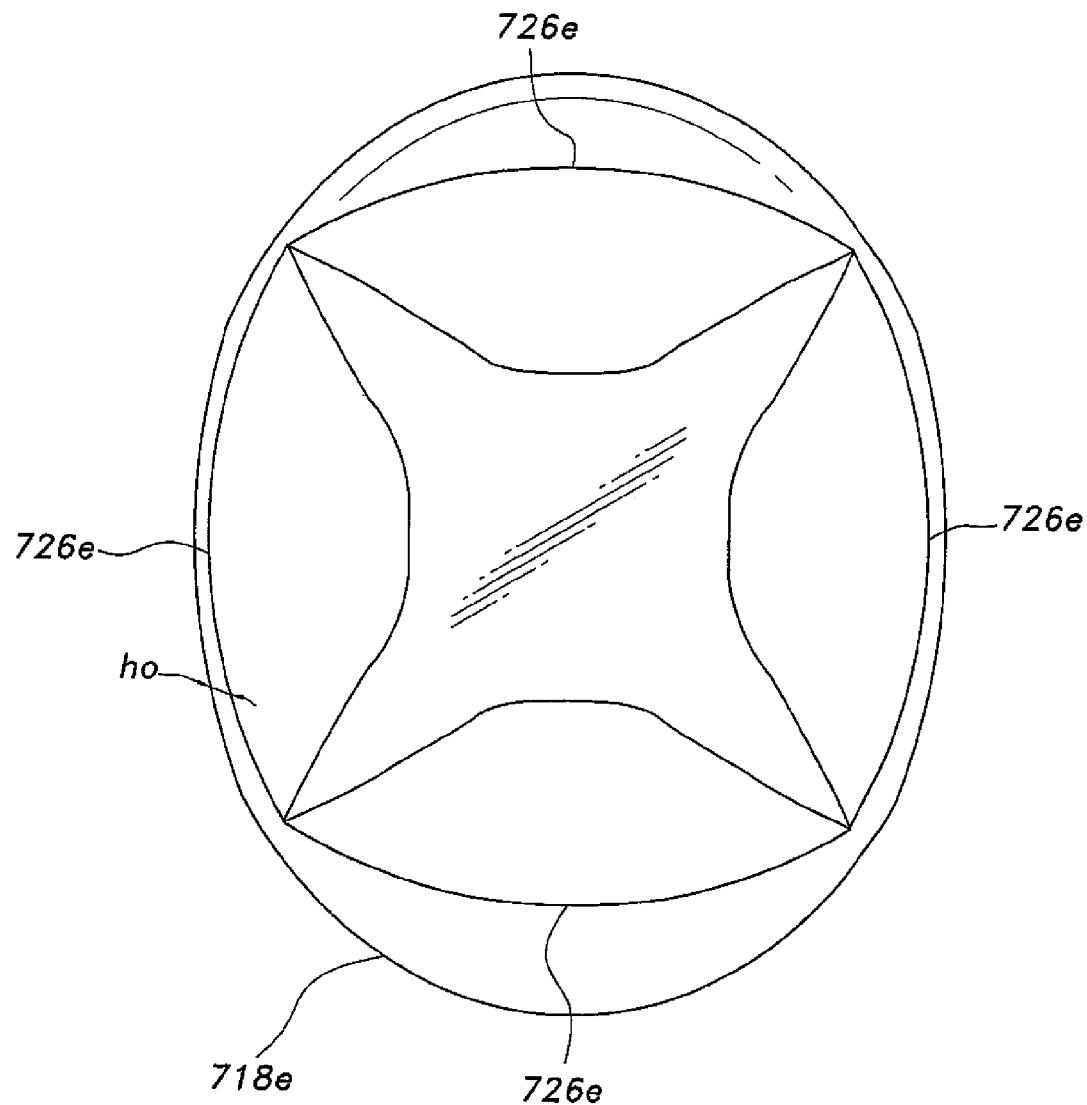
FIG. 7E is a diagram of the rotor and internal wall of the case or housing of the rotary mechanism with articulating rotor according to the present invention, which is generated by a point on the radius of a rolling circle, wherein the ratio of the distance of the point from the center of the rolling circle to the radius of the rolling circle approaches zero.

The epitrochoidal chamber shape 718c of FIG. 7C will be seen to be somewhat wider along its minor axis than the chamber shape 718b, in comparison to its major axis. This is achieved by setting the distance h at sixty percent of the length of the smaller circle radius r. The chamber shape 718d of FIG. 7D uses an even smaller length h to generate a shape having even less difference between lengths of the major and minor axes. In the case of FIG. 7D, h is selected as one-half the length of the radius r of the smaller circle. The final example, illustrated in FIG. 7E, uses a distance h of only thirty percent of the smaller circle radius r. Thus, the difference between the major axis and the minor axis lengths of the chamber shape 718e is only 1.3. As noted further above, as the length h approaches zero, the epitrochoidal chamber shape approaches a circle. While a pure circular chamber would not be operable in the present rotary mechanism, it may be desirable to vary the length or distance h to produce different aspect ratios between the major and minor axis lengths of the chamber in order to vary various parameters of the mechanism (e.g., compression ratios, etc.).

FIGS. 7A through 7E also illustrate another consideration for the rotary mechanism. It will be seen that as the shape of the epitrochoidal chamber varies, so must the outer shape of the rotor segments for optimum efficiency. It will be noted that, in each case, there is a small clearance gap ho between the minor diameter of the chamber (718a through 718e) and the respective rotor segment (726a through 726e). This permits the surfaces of the rotor segments to remain clear of the adjacent wall of the chamber, even at the narrowest portion of the chamber at and near the minor diameter. Sealing is accomplished by the apex seals 44 described further above as illustrated in FIGS. 1 through 4D and described further above.

Figure 8:
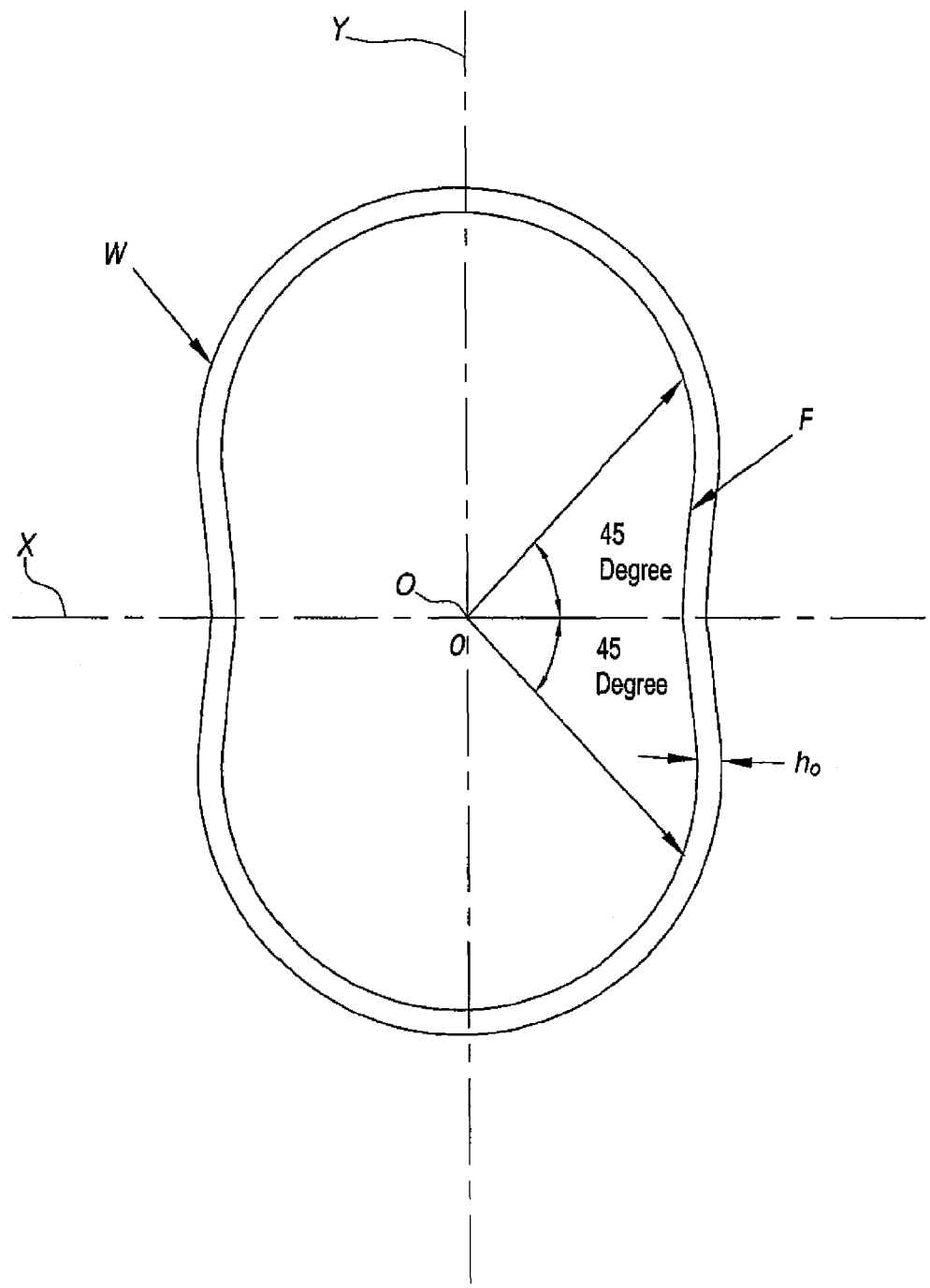
FIG. 8 is a diagram of the generation of the outer shape of the rotor segments of the rotary mechanism with articulating rotor according to the present invention.

FIG. 8 provides a graphical representation of the clearance gap ho between the epitrochoidal chamber wall W and the outer face F of the corresponding rotor segment, particularly as the rotor segment is essentially centered along the narrower minor diameter X of the chamber. While the shape of the outer face of the rotor segment is not critical as the segment passes through the areas of the major diameter along the Y axis, it becomes critical as the segment passes through the area of the minor axis X from about 45° to either side of the minor axis. The shape of the outer periphery or face F of the rotor segment is essentially congruent with the shape of the chamber wall W across the minor diameter area, and is given by the equations $x(\theta)=(3r-ho)\cos(\theta)-h\cos(3\theta)$ and $y(\theta)=(3r-ho)\sin(\theta)-h\sin(3\theta)$, where ho is the clearance distance between the periphery or wall of the epitrochoidal chamber and the outer periphery or face of each of the rotor segments with $\theta$ being limited to 45° symmetrically about the minor axis.

The above-described rotary mechanism in its various embodiments is adaptable to many different functions and operating environments, as described further above. The configuration of the mechanism as a power output device comprising an internal combustion engine has been described further above in the discussion of the operation shown in FIGS. 4A through 4D. Alternatively, the device in its various embodiments may be operated as a power output device comprising a fluid motor by providing symmetrically placed inlet and outlet ports on opposite sides of the case, the fluid under pressure causing the rotor to rotate as the fluid forces the expansion of the chamber volume portions through half of the cycle. Much the same configuration would allow the device to be operated as a pump, by applying a rotary force to the central shaft and rotating the rotor to draw a fluid through the case from inlet to outlet port(s). Operation as a compressor is easily accomplished by providing an outlet at the location of the spark plug illustrated in FIGS. 1, 2, and 4A through 4D, where the fluid is at its maximum compression. Accordingly, the versatility of the rotary mechanism with articulating rotor in its various embodiments provides a versatile device adaptable to a number of different operations and environments, with little modification required from the basic configurations described herein.

It is to be understood that the present invention is not limited to the embodiments described above, but encompasses any and all embodiments within the scope of the following claims.

I claim:

1. A rotary mechanism with articulating rotor, comprising:
    a case having a first end and a second end opposite the first end, the case defiling a two-lobe epitrochoidal chamber therein, wherein the epitrochoidal chamber is defined by:
        a center, a major axis, a minor axis, and a periphery formed by rolling a peripheral circle about a central circle, the periphery being defined by the equations $x(\theta)=3r\cos(\theta)-h\cos(3\theta)$ and $y(\theta)=3r\sin(\theta)-h\sin(3\theta)$, where x is the x-coordinate of the epitrochoidal curve aligned with the minor axis, y is the y-coordinate of the epitrochoidal curve aligned with the major axis, $\theta$ is the angle in degrees relative to the minor axis, r is equal to one-half of the radius of the central circle and is also equal to the radius of the peripheral circle defining the epitrochoid, and h is a fraction between zero and one of the radius r of the peripheral circle;
    a first end plate disposed upon the first end of the case;
    a second end plate disposed upon the second end of the case;
    an articulating rotor disposed within the case, the rotor having:
    first, second, third, and fourth rotor segments, each of the segments having mutually opposed first and second ends, wherein each of the rotor segments has an outer periphery, the outer periphery being defined by the equations $x(\theta)=(3r-ho)\cos(\theta)-h\cos(3\theta)$ and $y(\theta)=(3r-ho)\sin(\theta)-h\sin(3\theta)$, where ho is the clearance distance between the periphery of the epitrochoidal chamber and the outer periphery of each of the rotor segments, $\theta$ being limited to 45° symmetrically about the minor axis;
    first, second, third, and fourth knuckles pivotally connecting the first end of each of the segments to the second end of the adjacent one of the segments, each of the knuckles having an alignment rod socket and a diametrically opposed apex seal receptacle defined therein;
    an apex seal adjustably extending from the apex seal receptacle of each of the knuckles;
    a central shaft disposed through the case and the rotor;
    a central hub rotationally affixed to the rotor, the hub having four mutually orthogonal and radially disposed alignment rod receptacles defined therein; and
    a seal alignment rod telescopically extending from each of the alignment rod receptacles of the hub, each of the rods having a distal end installed in the alignment rod socket of a corresponding one of the knuckles, wherein each of the apex seals is held in axial alignment with the corresponding seal alignment rod and torque is transferred between the rotor and the shaft through the seal alignment rods and the hub.

2. The rotary mechanism with articulating rotor according to claim 1, wherein the mechanism is an internal combustion engine.

3. The rotary mechanism with articulating rotor according to claim 1, wherein the mechanism is a fluid pump.

4. The rotary mechanism with articulating rotor according to claim 1, wherein the central hub is rotationally affixed to the central shaft.

5. The rotary mechanism with articulating rotor according to claim 1, further comprising:
    a centrally disposed arm attachment lug disposed on each of the rotor segments; and
    a transverse arm rotationally affixed to the shaft, the arm having diametrically opposed first and second ends, the ends of the arm being pivotally affixed to the arm attachment lugs of two diametrically opposed rotor segments.

6. The rotary mechanism with articulating rotor according to claim 1, wherein the mechanism is a power output device.

7. The rotary mechanism with articulating rotor according to claim 1, wherein the mechanism is a fluid motor.

* * * * *